United States Patent [19]
Mortonson et al.

[11] 4,132,273
[45] Jan. 2, 1979

[54] TRACTOR HITCH CONTROL SYSTEM HAVING SAFETY FEATURES

[75] Inventors: Robert M. Mortonson, Park Ridge; Gale A. Holloway, Joliet, both of Ill.

[73] Assignee: International Harvester Company, Chicago, Ill.

[21] Appl. No.: 811,500

[22] Filed: Jun. 30, 1977

[51] Int. Cl.² ............................................ A01B 63/10
[52] U.S. Cl. .................... 172/2; 91/363 A; 172/7; 172/9
[58] Field of Search .................. 37/DIG. 1, DIG. 20; 172/2, 4, 4.5, 6–9, 11; 91/361, 363 R, 363 A; 214/762; 404/84

[56] References Cited

U.S. PATENT DOCUMENTS

| | | | |
|---|---|---|---|
| 3,125,856 | 3/1964 | Branson et al. | 91/363 R |
| 3,487,958 | 1/1970 | Shook et al. | 214/762 |
| 3,516,498 | 6/1970 | Schowalter | 172/9 |
| 3,724,330 | 4/1973 | Mason | 91/363 A |
| 3,808,948 | 5/1974 | Glaze | 91/363 A |
| 3,813,990 | 6/1974 | Coppola et al. | 91/363 A X |
| 3,955,783 | 5/1976 | Glaze et al. | 91/363 A X |
| 4,064,945 | 12/1977 | Haney | 172/4 |

FOREIGN PATENT DOCUMENTS 809758 3/1959 United Kingdom .................. 91/363 R

*Primary Examiner*—Vance Y. Hum

*Attorney, Agent, or Firm*—Douglas W. Rudy; Ronald C. Kamp; F. David AuBuchon

[57] ABSTRACT

A control system is provided for a hydraulically operated tractor hitch assembly including a rockshaft operated by a main cylinder which is controlled through a spool valve operated by a pilot cylinder which is controlled, in turn, through a solenoid operated pilot valve. The pilot valve is controlled in response to a command signal and first and second feedback signals which correspond to the position of the rockshaft and to the position of the spool valve member. The velocity of the downward movement is limited by limiting the amplitude of a first error signal which is developed by a first comparator responsive to the command and first feedback signals with the first error signal and the second feedback signal being applied to a second comparator. Such velocity-limiting operations are controlled through a manually operated switch or by a motion sense circuit responsive to the rate of change of the command signal. A command signal which has a fixed magnitude corresponding to a fully raised position is applied in a raise position of a raise-lower switch or in a transport lock position of a control lever. Error detector means are provided for sensing the loss of the first feedback signal and for applying a signal to cause centering of the main valve to lock the hitch against movement.

9 Claims, 2 Drawing Figures

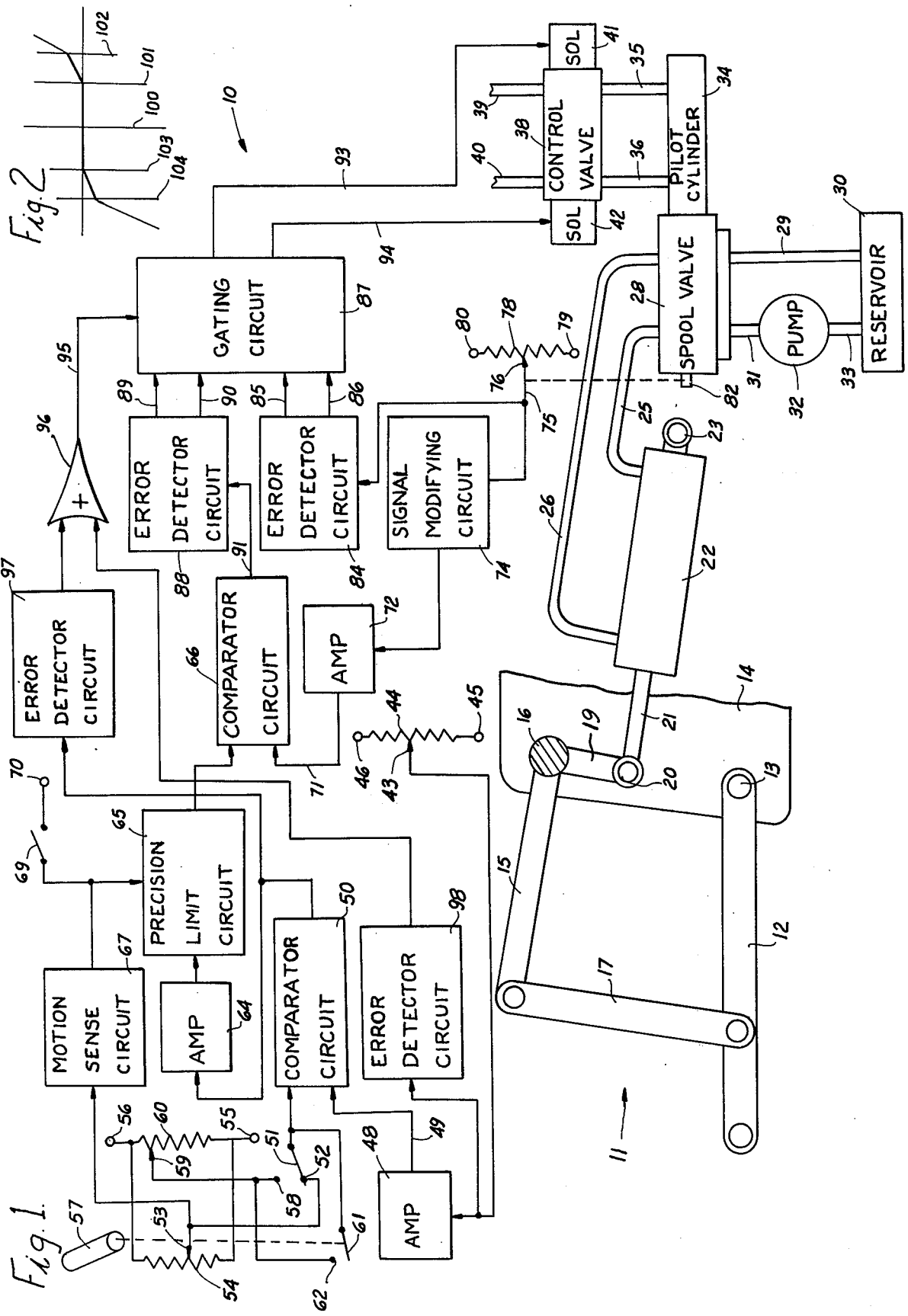

TRACTOR HITCH CONTROL SYSTEM HAVING SAFETY FEATURES

This invention relates to a control system for a hydraulically operated tractor hitch assembly and more particularly to an electrically controlled system having features which improve the reliability of the system and which provide increased safety.

BACKGROUND OF THE INVENTION

Electrically operated control systems have been developed for control of a hydraulically operated tractor hitch assembly of the type including a rockshaft operated by a main cylinder which is controlled through a main valve operated by a pilot cylinder which is controlled, in turn, through a solenoid operated pilot valve. In one of such systems, the pilot valve is connected to the output of detector means responsive to a command signal which corresponds to a target operational condition of the hitch assembly, to a first feedback signal corresponding to the actual operational condition of the hitch assembly and to a second feedback signal which corresponds to the position of a control element of the main valve.

With proper construction and operation of such a system, the position of the tractor hitch assembly can be smoothly and accurately controlled to obtain the desired operational condition of the tractor hitch assembly.

SUMMARY OF THE INVENTION

This invention was evolved with the general object of improving upon prior systems and particularly in providing improved reliability and increased safety.

An important feature of the invention relates to the control of the speed of movement of the hitch assembly in at least one direction as a safety feature and also to prevent a high velocity impact between the implement and an underlying surface which might cause damage to the implement especially when the supporting surface is of concrete or a rocky nature. In accordance with this feature, comparator circuit means are provided for responding to the command signal and the first and second feedback signals to develop an output signal which is applied to the detector means and velocity limiting means are provided for controlling the amplitude of the comparator output signal to control the pilot valve means and thereby the main control valve so as to limit the velocity of movement of the hitch assembly.

In accordance with a specific feature, a "feathering" operation is obtained when using a main control valve which has characteristics such that as a spool or other control element is moved away from a neutral position, flow is initiated at one position and then gradually increased until a second position is reached, with maximum flow being produced beyond the second position. The output signal of the comparator circuit is so controlled as to produce movement of the valve control element to a position intermediate the first and second positions at which the flow rate can be accurately controlled.

In accordance with additional specific features, the velocity limiting means is rendered effective either through operation of the switch means or in response to the signal from a motion sense circuit which is responsive to the command signal and which develops a control signal when the rate of change of the command signal exceeds a certain value.

Another important feature of the invention relates to the provision of means for supplying a command signal of a fixed magnitude corresponding to a fully raised position of the hitch assembly with switch means for supplying the second command signal to the comparator circuit means to override the first command signal and move the hitch to a fully raised position. In accordance with specific features, the switch means is operable when a control lever is moved to a fully raised position and is also operable when a transport lock device is moved to a locked position.

Another important feature relates to the provision of error detector means for sensing the loss of a first feedback signal which may result, for example, from severing of a connecting line extending to a potentiometer or other transducer used to develop the feedback signal. The error detector means is operable to control the pilot valve in a manner such that the main valve is moved to a neutral position, preventing flow to the main cylinder and locking the hitch in its position.

Additional features relate to the circuit arrangements used for obtaining such safety provisions.

This invention contemplates other objects, features and advantages which will become more fully apparent from the following detailed description taken in conjunction with the accompanying drawings.

BRIEF DESCRIPTION OF THE DRAWINGS

FIG. 1 is a schematic diagram of the tractor hitch position control system according to the invention, shown connected to a hydraulically controlled hitch assembly which is also illustrated diagrammatically; and FIG. 2 is a diagram showing graphically the characteristics of a main valve of the system.

DESCRIPTION OF A PREFERRED EMBODIMENT

Reference numeral 10 generally designates a tractor hitch position control system constructed in accordance with the principles of this invention. The system 10 is operable to control a hitch 11 including a lower arm 12 having a rearward end adapted to be secured to a plow or other implement and having a forward end secured to a shaft 13 supported and journalled from a rearward end portion 14 of a tractor. The hitch assembly further includes an upper arm 15 having a forward end secured to a rockshaft also supported and journalled from the rearward end of portion 14 of the tractor. The rearward end of the upper arm 15 is connected through a link 17 to the lower arm 12 at a point spaced forwardly from the rearward end of the lower arm 12. It will be understood that the illustrated linkage is mounted on one side of the tractor and a corresponding linkage is supported on the opposite side of the tractor, including an upper arm secured to the rockshaft 16. An actuating arm 19 secured to the rockshaft 16 is connected through a pin 20 to an end of a piston rod 21 the opposite end of which is secured to a piston movable within a hydraulic cylinder 22, cylinder 22 being connected to the tractor frame, as through a pin 23.

The hydraulic cylinder 22 is coupled through conduits 25 and 26 to a main control valve 28 which is coupled through a conduit 29 to a reservoir 30 and also through a conduit 31 to the outlet of a pump 32 having an inlet coupled through a conduit 33 to the reservoir.

The main control valve 28 is preferably a spool valve including a reciprocable spool member which is connected to a pilot piston movable within a pilot cylinder 34 which is connected through conduits 35 and 36 to a control valve 38 connected to fluid supply and return lines 39 and 40. The control valve 38 which may, for example, include a pair of poppet valve units is operable by a pair of solenoids 41 and 42.

The operation may be such that with both solenoids 41 and 42 deenergized, the supply line 39 is connected to both lines 35 and 36 so that fluid under pressure is applied to both ends of the pilot cylinder and the pilot piston is disposed in a centered position. When solenoid 41 is energized, fluid flow from the supply line to conduit 35 is cut off while conduit 35 is connected to the return line 40 while fluid under pressure is applied from the supply line 39 to the conduit 36, the spool of the valve 28 being then moved in one direction to allow flow of fluid from the outlet of pump 32 through conduit 31, spool valve 28 and conduit 25 to the cylinder 22 to move the piston rod 21 forwardly and to rotate the rockshaft 16 in a clockwise direction to raise the hitch assembly 11, return fluid from the cylinder 22 being allowed to flow through conduit 26 and conduit 29 to the reservoir 30.

As diagrammatically illustrated, the rockshaft 16 is coupled mechanically to a movable contact 43 of a potentiometer 44 having end terminals 45 and 46 which are connected to a voltage supply source to be at different voltage reference potentials, the signal thus being developed at the movable contact 43 which corresponds to the angular position of the rockshaft 16.

The signal developed at the contact 43 is applied to one input of a DC amplifier circuit 48 the output of which is connected through a line 49 to one input of a comparator circuit 50. A second input of the comparator circuit 50 is connected to a selector switch contact 51 which is shown in a "lower" position engaged with a contact 52 which is connected to a movable contact 53 of a potentiometer 54 having ends connected to terminals 55 and 56 for connection to a suitable DC voltage supply. The potentiometer contact 53 is mechanically coupled to a manually operable lever 57 which is adjustable to control the vertical position of the hitch 11 when the selector switch contact 51 is in its illustrated "lower" position as hereinafter described.

The selector switch contact 51 is movable to a "raise" position to engage a contact 58 which is connected to a movable contact 59 of a potentiometer 60 connected to the voltage supply terminals 55 and 56. Contact 59 is so adjusted as to cause the hitch 11 to be moved to a fully raised position when the selector switch contact 51 is moved to its "raise" position in engagement with the contact 58.

An additional switch is provided having a movable contact 61 connected to the selector switch contact 51 and engagable with a fixed contact 62 which is connected to the potentiometer contact 59. Contact 61 is mechanically connected to the lever 57 in a manner such that it is engaged with contact 62 when the lever 57 is moved in a hitch raising direction to a transport lock position, then insuring that the hitch 11 will be in a fully raised position.

The comparator circuit 50 operates to develop an error signal which differs from a predetermined reference value in accordance with the difference between a command signal applied from the selector switch contact 51 or from the switch contact 61 and a feedback signal from the potentiometer contact 43 which is mechanically connected to the rockshaft 16. The system responds to the error signal so developed to rotate the rockshaft 16 in the proper direction until the system is brought into balance. In particular, the error signal at the output of the comparator circuit 50 is applied to the input of a DC amplifier circuit 64 having an output connected through a precision limit circuit 65 to one input of a second comparator circuit 66. The precision limit circuit 65 is connected to the output of a motion sense circuit 67 having an input connected to the potentiometer contact 53. The motion sense circuit 67 includes a differentiating or rate-of-change circuit and when the velocity of movement of the lever 57 in a hitch-lowering direction exceeds a certain value, a signal is developed at the output of the motion sense circuit 67 which is applied to the precision limit circuit 65 which then limits the magnitude of the error signal applied to the comparator circuit 66 to a value such as to limit the position of the main spool valve within its feathering capabilities which in turn limits the downward speed of movement of the hitch 11.

The input to the limit circuit 65 which is connected to the output of the motion sense circuit 67 is also connectable through a switch 69 to a power supply terminal 70 for causing operation of the precision limit circuit 65 when the switch 69 is closed, to then limit the speed of downward movement of the hitch 11. The switch 69 operates as a "soft set down" control, limiting the speed at which an implement connected to the hitch may engage the ground.

The comparator circuit 66 has a second input connected through a line 71 to the output of a DC amplifier circuit 72. The input of the amplifier circuit 72 is connected through a line 73 to the output of a gain scheduled amplifier or signal modifying circuit 74 which has an input connected through a line 75 to a movable contact 76 of a potentiometer 78 having end terminals 79 and 80 which are connected to a voltage source to be at different voltage reference potentials.

As diagrammatically indicated, the movable contact 76 is mechanically coupled to a projecting rod portion 82 of the spool valve 28, the rod portion 82 being connected to the spool member of the valve 28. The movable contact 76 is also connected electrically through the line 75 to the input of an error detector circuit 84 having a pair of outputs connected through lines 85 and 86 to a gating circuit 87.

Another error detector circuit 88 is provided having outputs connected through lines 89 and 90 to the gating circuit 87 and having an input connected through line 91 to the output of the comparator circuit 66. Gating circuit 87 has outputs connected through lines 93 and 94 to the raise and lower solenoids 41 and 42 and is controlled through a line 95 connected to the output of a gate circuit 96 having an input connected to the output of another error detector circuit 97 which has an input connected to the output of the comparator circuit 50.

The gate circuit 96 has a second input connected to the output of an error detector circuit 98 which has an input connected to the line from the potentiometer contact 43 at or near to the point at which it is connected to the input of the amplifier 48. The error detector circuit 98 responds to an input signal which has a magnitude out of the normal range of signals applied from the potentiometer contact 43, the purpose being to detect severing of the line between potentiometer contact 43 and the input of the amplifier 48 or to detect any other malfunction having the same effect. When the error detector circuit 98 develops an output signal it is applied through the gate circuit 96, which operates as an "OR" gate, to the gating circuit 87 to cause the error detector circuit 84 to control and to obtain an operation as hereinafter described.

When the system is in a quiescent state in which the control lever 57 is stationary and the rockshaft 16 is stationary and at a corresponding angular position, the error signals developed at the outputs of the comparator circuits 50 and 66 have substantially zero values, i.e. values equal or very nearly equal to predetermined reference potentials which may be either a ground potential or a potential at a fixed level relative to ground. When under such conditions, the control lever 57 is rotated through a substantial angle to a different angular position, an error signal is developed at the output of the first comparator circuit 50 which is applied through the amplifier circuit 64 and through the limiter circuit 65 to one input of the second comparator circuit 66 which then develops an error signal detected by the error detector circuit 88. At the same time, the error detector circuit 97 responds to the error signal developed by the first comparator circuit 50 to apply a signal through gate circuit 96 and line 95 to the gating circuit 87 and to cause the output lines 89 and 90 from the error detector circuit 88 to be connected to lines 93 and 94 and thus to the solenoids 41 and 42.

One or the other of the solenoids 41 and 42 is then energized depending upon the polarity of the signal applied from the comparator circuit 66 through line 91 to the error detector circuit 88. If, for example, the solenoid 41 is energized, fluid may flow from the supply line 39 through the control valve 38 and line 36 to the pilot cylinder 34 to move the spool of the spool valve 28 in a direction to so control flow as to allow the hitch assembly 11 to lower.

During such operation, a feedback signal is applied from the potentiometer contact 76 through line 75 and through the signal modifying circuit 74, amplifier circuit 72 and line 71 to the comparator circuit 66 in opposition to the error signal applied through the limiter circuit 65 to the other input of the comparator circuit 66. As the angular position of the rockshaft 16 approaches a target position corresponding to the angular position of the control lever 57, the magnitude of the error signal applied through the limiter circuit 65 decreases and before the final target position is reached, the polarity of the error signal developed at the output of the comparator circuit 66 and applied through line 91 to the error detector circuit 88 reverses to cause a signal to be applied through line 90, gating circuit 87 and line 94 to the solenoid 42. As a result, the spool member of the spool valve 28 is moved in the reverse direction to cut off flow to the main cylinder 22.

When the spool member is so moved to cut off flow to the main cylinder 22, the rockshaft is at its target angular position and the error signal developed at the output of the first comparator circuit 50 as well as the corresponding signal from the output of the amplifier circuit 64 are of substantially zero magnitudes. Also, the feedback signal applied through line 71 to the other input of the second comparator circuit 66 is of substantially zero magnitude, so that no error signal is detected by the error detector circuit 78 and both the solenoids 41 and 42 are deenergized. It is noted, in this connection, that the signal modifying circuit 74 has characteristics which are correlated to the characteristics of the spool valve 28. Spool valve 28 has what may be referred to as a "dead zone" in which a certain movement of the spool member away from a centered or neutral position is required before there will be flow in either direction. The signal modifying circuit 74 is arranged to develop a feedback signal at its output only when the spool member is moved in either direction beyond the limits of the dead zone. It is, however, desirable that the spool member be moved to a centered or neutral position following a positioning operation, and the error detector circuit 84 functions for this purpose. When the rockshaft reaches a target angular position and the error signal at the output of the comparator circuit 50 is reduced to substantially zero magnitude, the error detector circuit 97 applies a signal through gate circuit 96 to the gating circuit 87 at a level such that the gating circuit 87 disconnects the lines 93 and 94 from the output lines 85 and 86 of the error detector circuit 84. The input of the error detector circuit 84 is connected directly through the line 75 to the potentiometer contact 76 and one or the other of the solenoids 41 or 42 is energized to move the piston of the pilot cylinder 34 and thereby the spool member of the spool valve 28 to a centered or neutral position.

The operation as above described is a normal or typical operation obtained with the switches 51, 61 and 69 in positions as illustrated, with no signal output from the error detector circuit 98 and with no output signal being developed by the motion sense circuit 67, the precision limit circuit 65 being inoperative as to performing any limiting action on the signals applied therethrough from amplifier circuit 64 to the one input of the comparator circuit 66. In such normal or typical operation, it is important to maintain the proper relationship between amplification factors, signal and threshold levels, component characteristics and loads in order to obtain optimum operation and maintaining proper relationships is also important with respect to the operation of the precision limit circuit 65 and motion sensing circuit 67 and also with respect to the error detector circuit 98.

One important consideration is the spool valve 28 which, as above noted, has a "dead zone." FIG. 2 illustrates such characteristics graphically wherein the rate of flow through the valve 28 is plotted against the position of the spool valve member. When the spool member is moved in one direction away from the centered or neutral position indicated by reference numeral 100, there is no flow until a position 101 is reached and then the flow is gradually increased until a position 102 is reached. Beyond the position 102, the flow rapidly increases with maximum flow being produced at positions therebeyond. The characteristics in the reverse direction are similar, there being no flow until a position 103 is reached, gradually increasing flow to a position 104 and maximum flow at positions beyond position 104.

The amplification factors and signal and threshold levels in the electronic circuits are set to take such characteristics of the spool valve into consideration. The gain scheduled amplifier or signal modifying circuit 74, for example, has threshold values corresponding to the dead zone of the spool valve, below which no amplification is produced and above the threshold values, the gain of the circuit is related to the slope of the characteristics of the spool valve in the ranges between positions 101 and 102 and between positions 103 and 104, which may be referred to as "feathering" ranges such that responsive control of the flow is obtained in order to obtain smooth and accurate control of the position of the hitch.

The precision limit circuit 65 operates in response to an output signal from the motion sense circuit 67, or from the signal applied by closing of the "soft set down" switch 69 to cause the spool valve member to be positioned in its "feathering" range corresponding to downward movement of the hitch assembly. By way of example, the velocity of downward movement of the hitch may be limited to a maximum velocity of on the order of one inch to two inches per second.

The error detector circuit 88 should have threshold levels low enough in relation to the amplification of the feedback and main error signals to obtain accurate positioning but high enough to avoid over-shoot, under-shoot and oscillatory actions. The error detector circuit 84 should have threshold values which are comparatively less than those for the error detector circuit 88 since circuit 84 is operative only for centering of the spool valve 28 when the system is otherwise balanced. The threshold levels for the error detector circuit 97 are low enough to obtain a position adjustment when there is a significant shift from the desired position but not so low as to bring the pilot and main valves into operation unnecessarily when the position is within reasonable limits.

The error detector circuit 98 is set according to the limits of normal travel of the rockshaft 16 to sense a loss of signal from the potentiometer contact 43 and it is noted that when the error detector 98 develops an output signal it is applied through the gate circuit 96 and through line 95 to the gating circuit 87 to cause the error detector circuit 84 to operate to center the spool valve 28, thereby precluding movement of the hitch in either direction.

It will be understood that modifications and variations may be effected without departing from the spirit and scope of the novel concepts of this invention.

We claim as our invention:

1. A control system for a hydraulically operated tractor hitch assembly which includes a main cylinder for controlling hitch raising and lowering movements, a main control valve including a control element for controlling fluid flow to said main cylinder, a pilot cylinder for operating said main valve control element, and electrically operated pilot valve means for controlling fluid flow to said pilot cylinder, said control system comprising:
   means for supplying a command signal having a magnitude corresponding to a target condition of said hitch assembly;
   first feedback means for developing a first feedback signal corresponding to an actual condition of said hitch assembly;
   second feedback means for developing a second feedback signal corresponding to the position of said main valve control element;
   comparator circuit means comprising a first comparator circuit responsive to said command and first feedback signals to develop a first error signal and a second comparator circuit responsive to said first error signal and second feedback signal to develop a second error signal forming said output signal of said comparator circuit means;
   detector means responsive to said comparator circuit means output signal and arranged to control said electrically operated pilot valve means for controlling positioning of said main valve control element and movement of said hitch assembly to produce said target condition; and
   velocity limiting means for controlling the amplitude of said comparator output signal to control said pilot valve means and thereby position of said main control valve to limit the velocity of movement of said hitch assembly in at least one direction said velocity limiting means also comprising means for limiting the amplitude of said error signal.

2. In a system as defined in claim 1, motion sense means responsive to said command signal and operative for developing a control signal when the rate of change of said command signal exceeds a certain value, said certain value as limited by the main spool valve feathering ability, and means for applying said control signal to said velocity limiting means for initiating operation thereof.

3. In a system as defined in claim 1, said main control valve having characteristics such that with movement of said control element thereof in each direction from a neutral position flow is initiated at a first position spaced from said neutral position and is then gradually increased until a second position is reached with maximum flow being produced at positions beyond said second position, said output signal being so controlled as to produce movement of said control element to a position intermediate said first and second positions.

4. In a system as defined in claim 1, means for supplying a second command signal at a fixed magnitude corresponding to a fully raised position of said hitch assembly, and switch means for selectively applying said second command signal to said comparator circuit means.

5. In a system as defined in claim 1, said first feedback means comprising transducer means mechanically coupled to said hitch assembly to develop said first feedback signal, coupling means for applying said first feedback signal to said comparator circuit means, feedback error detector means connected to one point of said coupling means for developing a feedback error signal when the amplitude of said feedback signal at said point is outside predetermined limits corresponding to the upper and lower voltage values seen at end terminals (45) and (46) respectively, and means responsive to said feedback error signal for operating said main valve control element to a neutral position to prevent flow to and from said main cylinder.

6. The control system for a hydraulically operated tractor hitch assembly which includes a main cylinder for controlling hitch raising and lowering movements, a main control valve including a control element for controlling fluid flow to said main cylinder, a pilot cylinder for operating said main valve control element, and electrically operated pilot valve means for controlling fluid flow to said pilot cylinder, said control system comprising: means for supplying a first command signal corresponding to a target condition of said hitch assembly, a first feedback means for developing a first feedback signal corresponding to an actual condition of said hitch assembly, second feedback means for developing a second feedback signal corresponding to the position of said main valve control element, comparator circuit means responsive to said command signal and said first and second feedback signals to develop an output signal, detector means responsive to said comparator circuit means output signal and arranged to control said electrically operated pilot valve means for controlling positioning of said main valve control element and movement of said hitch assembly to a target condition, means for supplying a second command signal at a fixed magnitude corresponding to a fully raised position of said hitch assembly and switch means for selectively applying said second command signal to said comparator circuit means.

7. In a system as defined in claim 6, a control lever for controlling the magnitude of said first command signal and movable toward a fully raised command position for producing a fully raised position of said hitch assembly, said switch means being connected to said control lever for actuation to apply said second command signal to said comparator circuit means in said fully raised position of said control lever.

8. In a system as defined in claim 6, a manually operable transport lock device connected to said switch means.

9. A control system for a hydraulically operated tractor hitch assembly which includes a main cylinder for controlling hitch raising and lowering movements, a main control valve including a control element for controlling fluid flow to said main cylinder, a pilot cylinder for operating said main valve control element, and electrically operated pilot valve means for controlling fluid flow to said pilot cylinder, said control system comprising:

means for supplying a command signal having a magnitude corresponding to a target condition of said hitch assembly;

first feedback means for developing a first feedback signal corresponding to an actual condition of hitch assembly;

second feedback means for developing a second feedback signal corresponding to the position of said main valve control element;

comparator circuit means comprising a first comparator circuit responsive to said command and first feedback signals to develop a first error signal and a second comparator circuit responsive to said first error signal and said second feedback signal to develop a second error signal forming said output signal of said comparator circuit means;

detector means including a first detector circuit responsive to said second error signal, a second detector circuit responsive to said second feedback signal, gating means for selective control of said pilot valve means from said first detector circuit or said second detector circuit, a third detector circuit responsive to said first error signal to control said gating means to operate said pilot valve means from said first detector circuit when said first error signal has a magnitude greater than a threshold value corresponding to desired control handle (57) sensitivity and operative to control said gating means to operate said pilot valve means from said second detector circuit when said first error signal has a magnitude less than said threshold value, and means for applying said feedback error signal to said gating means to control said gating means to operate said pilot valve means from said second detector circuit irrespective of the magnitude of said first error signal, said first feedback means comprising transducer means mechanically coupled to said hitch assembly to develop said first feedback signal and coupling means for applying said first feedback signal to said comparator circuit means;

feedback error detector means with upper and lower voltage value means connected to one point of said coupling means for developing a feedback error signal when the amplitude of said first feedback signal at said point is outside predetermined limits corresponding to the upper and lower voltage values seen at end terminals (45) and (46) respectively; and means responsive to said feedback error signal for operating said main valve control element to a neutral position to prevent flow to and from said main cylinder.

* * * * *